United States Patent Office 2,951,316
Patented Sept. 6, 1960

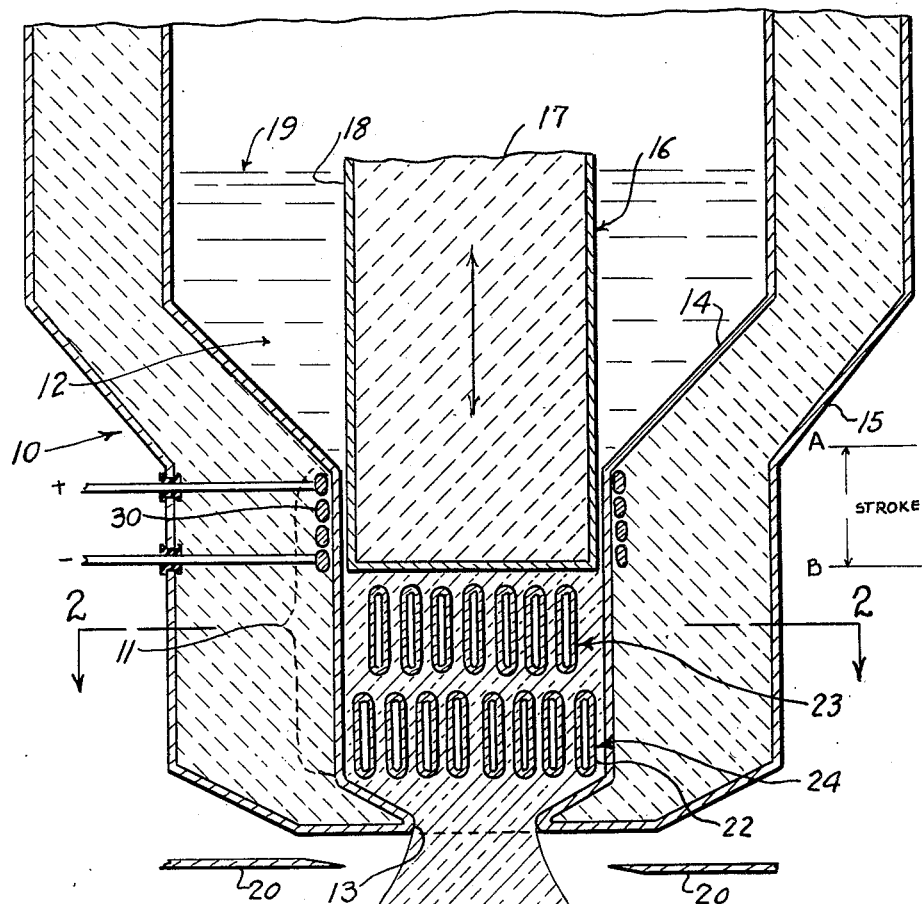

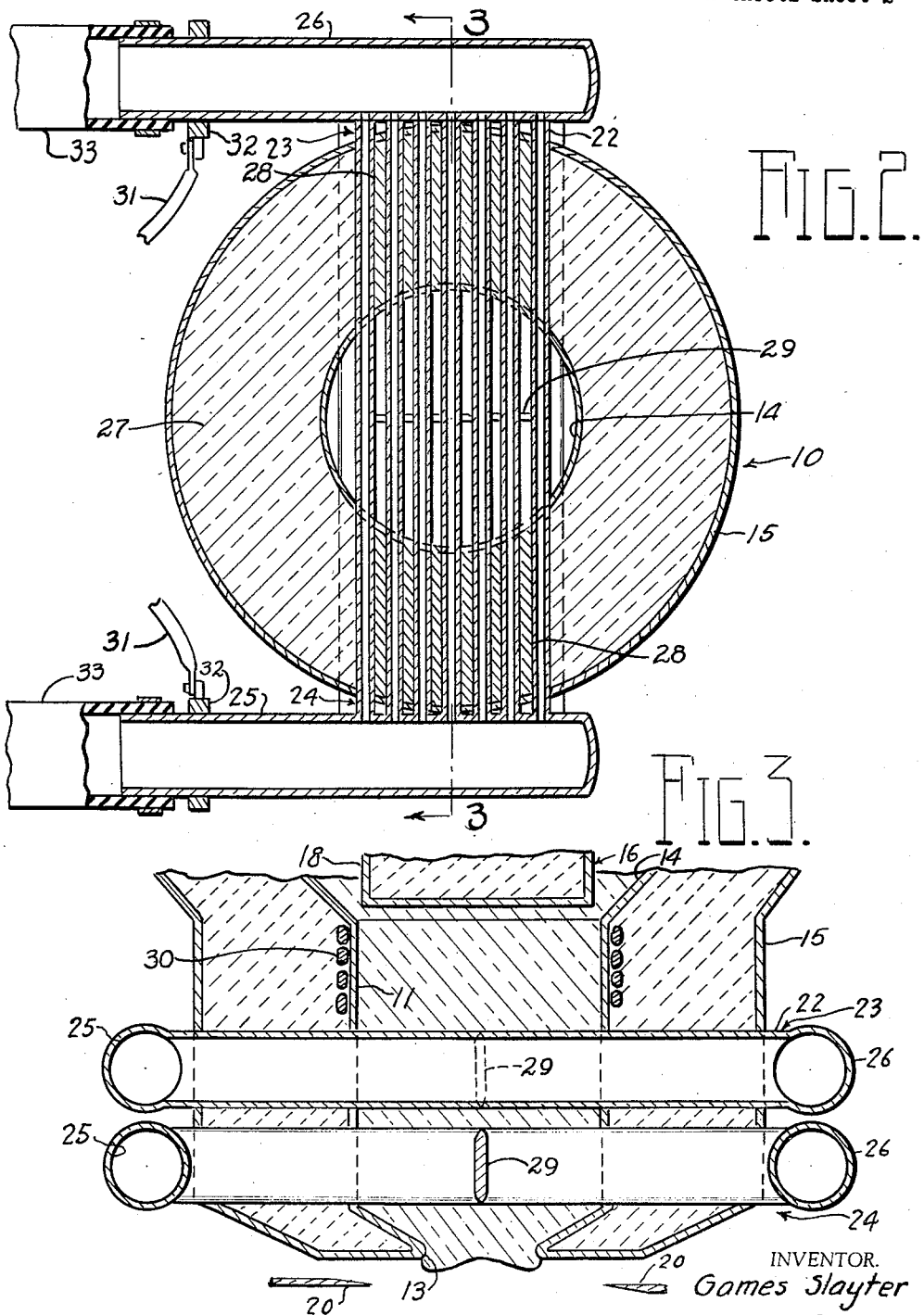

2,951,316

PROCESS FOR MOLDING MASSIVE BODIES OF GLASS HAVING HIGH STRENGTH

Games Slayter, Newark, Ohio, assignor to Owens-Corning Fiberglas Corporation, a corporation of Delaware Filed Nov. 5, 1956, Ser. No. 620,236

6 Claims. (Cl. 49—77)

This invention relates to a process for molding massive bodies of glass having high strength. The term "massive bodies" is intended to include bodies of glass of any shape wherein the glass itself is present in sections having substantial thickness. It is intended, therefore, to exclude continuous fibers or films of glass, where the maximum sections are measurable only in a few thousandths of an inch.

The process of the invention is directed toward the handling of measured charges of molten glass intended to be delivered to conventional multiple mold machines where measured gobs of glass are fed to successively presented molds. It is the purpose of the invention to provide a method for handling the molten glass which will give to the glass strengths more nearly approaching the extremely high strengths achievable in the fabrication of glass in the form of fibers. It is known, for example, that fibrous glass has a tensile strength in the order of 200,000 lbs. p.s.i. In contrast, ordinary molded glass has a tensile strength in the order only of 10,000–15,000 p.s.i. The flexural strength of fibrous glass is also in the order of 200,000 p.s.i., whereas the flexural strength of conventional massive bodies of glass is as low as 2000 p.s.i.

Electron microscopic examination reveals that massive bodies of ordinary glass produced by conventional techniques incorporate formations which may be aggregates of molecules, sub-crystalline in nature, but apparently formed by the beginning of ordered arrangements of the molecules such as are ultimately found in crystals. These sub-crystalline structures are herein called "micelles."

There seems to be a correlation between the quantity and size of the micelles and the strength of the glass bodies. It appears that the larger the micelles present in the glass, the weaker the body of glass. There also appears to be a correlation between the thermal history of the glass before it is worked and the existence or absence of the micelles.

Analysis of commercial processes for the fabrication of fibrous glass reveals that the fibers are formed in a way such that the glass in the fibers is very rapidly chilled by reason of the very fine diameters of the fibers and the consequent proportionally much greater surface area relative to volume, which is exposed to the chilling effect of the environmental atmosphere.

Apparently when glass at high temperature is rapidly chilled to its working temperature the formation of micelles in the glass is definitely inhibited. The rapid chilling accounts for the great strength of glass fibers, in which micelles do not appear to be present, compared to the strength of the glass in ordinary massive bodies produced by conventional techniques. In contrast, in conventional techniques, the glass is held at its working temperature for a long time prior to its actual working.

It is the object of the present invention to provide a method for handling measured charges of glass usable for the formation of massive bodies in a way which will prevent the formation of micelles to a large extent and will result in the glass having strengths substantially greater than glass in similar bodies which is molded by conventional molding techniques.

It is another object of this invention to provide a process for so handling measured charges of molten glass as to approach the known method for producing fibrous glass and to achieve greater strengths in the massive bodies molded from the measured charges.

It is a further object of the invention to provide a method for the handling of measured charges of molten glass in a manner such that the charges of glass are rapidly chilled during the selection of the charge of measured volume from a high temperature supply and its delivery to the molding machine.

The essentials of the process of the invention are these: the glass initially shall be relatively high in temperature and fluidity, including its maintenance at such elevated temperature; a measured charge of the glass shall be isolated or selected from the molten pool or supply; the charge shall then be rapidly chilled to its selected working temperature with consequent rapid rise in viscosity. Micelle formation is believed to be a time-temperature phenomenon. Chilling the glass rapidly to the selected working temperature seems to drop the temperature of the glass so fast that micelle formation is greatly inhibited and, in fact, may be eliminated.

The foregoing theoretical explanation is presented herewith merely to serve as a possible basis for an analysis of the process constituting the invention, but is not intended in any way to restrict or limit the scope of the invention or the steps of the process itself.

In the drawings:

Fig. 1 is a fragmentary, simplified, vertical sectional view approximately on the center line of a gob feeder designed and operated according to the invention for the repeated presentation of gobs of high strength glass for deposition in the molds of conventional glass molding machinery.

Fig. 2 is a fragmentary, horizontal sectional view taken substantially along the line 2—2 of Fig. 1.

Fig. 3 is a fragmentary, vertical sectional view taken along the line 3—3 of Fig. 2 and lying in a vertical plane normal to the plane of Fig. 1, means for applying feeding pressure to the glass being shown at the upper limit of its stroke in Fig. 3 whereas such means is shown at the bottom of its stroke in Fig. 1.

Fig. 4 is a fragmentary, vertical, sectional view similar to Fig. 1 but on a smaller scale and illustrating a reciprocal valving means which may be employed according to the invention.

The apparatus illustrated in the drawings is only fragmentarily shown and is intended to be employed with conventional mechanism known in the art both for the initial melting of the glass, for the actuation of the feeding plunger, for the severance of a measured charge or gob and for its deposition in conventional molds of commercial glass molding machinery.

A refractory chamber generally indicated at 10 is suitably mounted at the end of a glass tank below its forehearth (not shown) for the reception of molten glass from the main tank. The chamber 10 has a cylindrical section 11 (delineated by the bracket bearing that number in Fig. 1), a larger flared upper section 12 and a narrow orifice 13. The chamber 10 is illustrated as being formed from refractory material having a metallic inner jacket 14 and an outer jacket 15. Conventional supports and other structural members and suitable insulation as may be necessary are not shown in the drawings but should be employed in the manner known in the art.

In apparatus for practicing the invention, the conventional blunt nosed plunger of a commercial gob feeding mechanism is replaced by a cylindrical plunger 16. The plunger 16 may be fabricated from various materials depending upon the constituency of the glass being employed and upon whether or not the plunger will be wholly immersed in the glass or whether it will be exposed to atmosphere above the glass in the chamber 10. For examples, if the plunger 16 is to be wholly immersed in the glass at all times, it may be fabricated from molybdenum. If, on the other hand, the structure is such that the plunger 16 will not always be immersed, at least its exterior should be fabricated from a noble metal or a suitable noble metal alloy. In Fig. 1 the plunger is illustrated as having a refractory core 17 and a noble metal jacket 18. It will be observed that the exterior diameter of the plunger 16 is but slightly smaller than the interior diameter of the cylindrical section 11 into and out of which the plunger 16 works. The plunger 16 is reciprocated vertically, as indicated by the arrow thereon, by suitable mechanism (not shown) which is timed relative to the molding machine so that a gob or mass of glass will be presented for deposition in each of the molds of the molding machine as they serially pass beneath the orifice 13. The rapidity of the reciprocation depends upon the frequency of presentation of the molds and is limited only by known factors such as the minimum time necessary for forcing the glass through the orifice 13 with the pressure available and at the temperature selected. The down stroke of the plunger 16 probably will be much more rapid than its up stroke in order to minimize the suction created during the up stroke. This relationship, again, will be modified by the precise working temperature and viscosity at which the glass is formed into a gob. This, as is known in the art, is, at least partially, determined by the size and shape of the mold to be filled. As in other feeding machines, the speed during the down stroke may be suitably varied to change the cross section of the gob being fed.

The size of the measured volume or charge of glass forming each of the gobs to be molded depends of course upon the diameter of the cylindrical section 11 and upon the length of stroke of the plunger 16. Because of the close clearance between the plunger 16 and the cylindrical section 11 the device functions as a force pump. Since the diameter of the cylindrical section 11 cannot be changed, any particular chamber 10 is limited to a range of size of gobs which can be fed by the length of stroke of the plunger 16. For example, as indicated in Fig. 1, the plunger 16 may be movable between limits shown by the lines designated A and B and the arrow labeled "stroke." This maximum stroke permits the plunger 16 to be lifted sufficiently high so that the glass from a pool 19 in the section 12 can flow beneath the plunger 16 at the upper end of its stroke (Fig. 3). The precise volume of the measured charge is determined by how far down the plunger 16 is pushed. The upper limit of its stroke is constant and the lower limit changed in order to vary the volume of the charge.

At a level beneath the orifice 13 conventional shears 20 are fragmentarily shown, their actuation being timed relative to the movement of the molds of the molding machine so that after a gob indicated at 21 has been extruded through the orifice 13, the shears 21 sever the gob so that it drops into an open mold (not shown) which has been moved into position beneath the orifice 13. The plunger 16 is then lifted to allow a subsequent charge of glass to flow into the cylindrical portion 11, the shears 20 are opened and, upon subsequent actuation, the plunger 16 descends, again forming a gob 21 which is severed by the shears 20 into the next subsequent one of the molds on the molding machine.

So far the apparatus described is but slightly different from that employed in conventional gob forming machines, the primary difference being that the plunger 16 fits closely into the cylindrical portion 11 of the chamber 10. In a conventional gob forming apparatus the chamber 10 would not have a cylindrical portion 11 of any axial extent but the orifice 13 would be located immediately at the bottom of the larger flared portion 12 of the chamber 10.

The purpose for the elongated cylindrical section 11 of apparatus designed to be operated according to the invention is to provide a location in which a measured charge of glass can be rapidly chilled immediately after its separation from the main pool of glass 19. Means for thus rapidly chilling the glass is illustrated in the drawings as consisting of a plurality of transverse conduits 22 arranged in two banks, the banks being generally indicated at 23 and 24. Each of the conduits 22 (see Figs. 2 and 3) communicates with a pair of main headers 25 and 26 extending along opposite sides of the chamber 10. As can best be seen in Figs. 1 and 2 the conduits 22 are spaced laterally a distance even less than their maximum thickness and each bank is staggered relative to the other so that the individual conduits 22 of the upper bank 23 are positioned above inter-conduit spaces in the lower bank 24. The conduits 22 thus cause the separation of glass being forced therebetween into a plurality of thin sections or separate streams and each stream passing between the conduits in the bank 23 is again separated by one of the conduits in the bank 24. Therefore, during the downward movement of the plunger 16 glass being forced between the conduits 22 is divided into thin sections and exposed over a very large area to the chilling effect of suitable heat absorbing fluid pumped through the conduits 22. For example, steam may be forced through the conduits 22 so that heat is transferred rapidly from the glass to the metal forming the conduits 22 over the very large area of the conduits 22, and from the conduits 22 to the steam.

The conduits 22 must be fabricated from material capable of rapid heat transfer and also of resisting the corrosive effect of glass passing thereover at the temperatures involved. Noble metals and noble metal alloys, particularly platinum and its alloys, are, as is known, most effective for this purpose.

Sections of the conduits 22 may be strengthened where they extend through refractory 27 by metal spacers 28 which are welded or secured to the conduits 22. The central portions of the conduits 22 are connected by cross braces 29.

Operating with ordinary soda lime glass it is desirable that the pool 19 be maintained at a temperature of from 2700–2900° F. In apparatus operated according to the invention this temperature may be reduced to as low as 1850–2100° F. in the brief span of time necessary to push the charge of glass beneath the plunger down into the multiple spaces between the conduits 22. The body of glass thus pushed into place between the conduits 22 remains threin only long enough to allow the plunger 16 to be raised, permitting a new charge of glass to be separated from the pool, so that upon subsequent downward movement of the plunger 16 the previously chilled glass will be forced through the orifice 13 to form the gob 21. It has been further found that, by careful control of the heat transfer effected from the glass to the steam or other heat absorbing medium, the glass can be held in the cylindrical portion 11 of the chamber 10 for as long as 30 seconds without derogating the strength factor maintained by the practice of the present invention. It is not necessary, of course, to hold the glass in the position between the conduits 22 for any such length of time, it being necessary only for a few seconds to intervene between subsequent strokes of the plunger 16.

As briefly explained above, the diameter of the cylindrical portion 11 and the maximum and minimum strokes of the plunger 16 are the determinative factors which fix the range or volume of the gobs which a single apparatus operated according to the invention can furnish to a molding machine. In addition, apparatus operated according to the inveniton requires variation in the control of the feeding of the heat absorbing medium, for example, steam, utilized to effect the rapid chilling of the glass according to the invention. When the lower corners of the plunger 16 pass the upper corners of the cylindrical portion 11 the pump action of the plunger 16 first comes appreciably into effect. Because of the high temperature of the glass in the pool 19 it is extremely fluid and only when the plunger 16 virtually closes the cylindrical portion 11 does the glass begin to flow between the conduits 22. Steam or other heat absorbing medium should, therefore, commence to flow through the conduits 22 at about the time when the glass begins to flow between the conduits 22. The flow of the heat absorbing medium must be so controlled that the temperature of the conduits 22 does not get too far below the minimum temperature of the glass which is to be achieved. It is thus probable that the flow of heat absorbing medium through the conduit 22 must be stopped before the plunger 16 reaches the bottom of its stroke. This allows for the short time lag when the plunger 16 is moving upwardly and during which time additional heat will be withdrawn from the glass to the conduits 22.

The particular temperature of the heat absorbing medium employed, i.e., the steam or other fluid, even water, will be determinative of the time when its flow should commence and end, within, of course, the maximum times determined by the stroke of the feeding plunger 16. Correlation between the timing of actuation of the plunger 16, the shears 20 and the molding machine is controlled in order that the measured charge of glass worked by being separated and reseparated between the conduits 22, and rapidly chilled by the heat absorbing medium passing through the conduits 22, will arrive at the orifice 13 and in the molds of the molding machine at low temperature and with the high strength resulting from the practice of the invention.

Because of the relatively close clearance between the plunger 16 and the wall of the cylindrical portion 11, it may be desirable to apply controlled heat to the neck section of the portion 11 where it joins the flaring wall of the upper section 12 in order to prevent any possibility of freezing up of the glass in the thin section between the plunger 16 and wall 14. A conventional resistance coil 30 with suitable electrical connections and controls is shown for this purpose.

Additional electrical connections are shown for the purpose of energizing the headers 25 and 26 to flow current through the conduits 22 as heaters in order to remelt glass in the cylindrical portion 11 after a shut down. Cables 31 are connected by connectors 32 to the headers 25 and 26. Non-conducting fluid lines 33 are secured to the headers 25 and 26 to bring the heat exchange fluid thereto.

Fig. 4 illustrates and additional valving means which may be employed for obviating the possibility of withdrawing the glass from the cylindrical portion 11a during an up stroke of the plunger 16. A perforated sleeve 34 is mounted for reciprocation coaxially with a plunger 16a. In this case, the outside diameter of the plunger 16a is considerably smaller than the cylindrical portion 11a. The sleeve 34 has a collar 35 which engages a shoulder 36 at the bottom of its stroke to obstruct the open space between the plunger 16a and the inner wall of the portion 11a. The sleeve 34 is reciprocated in timed relation to the reciprocation of the plunger 16a so that the collar 35 closes the opening around the plunger 16a just before the start of a down stroke and opens the space just before the start of an up stroke. This prevents loss of pressure during the down stroke and opens the space to provide for free flow of fluid glass during the up stroke.

By extremely careful control of the flow and temperature of the heat absorbing medium, the process of the invention may be made continuous. The essentials of the invention require that the body of glass in the separated charge be reduced rapidly in temperature. The process of the invention achieves this by separating it into a multiplicity of thin sections and exposing a very large area relative to volume to the heat absorbing effect of the medium fed through the conduits 22. It is not necessary to the invention that the glass be left in place between the conduits 22 for any appreciable lenght of time.

A positive continuous feeding mechanism such as a twin rotor, screw feeder could be employed to put pressure upon the glass in the pool 19 and feed it continuously through the chilling means. A positive atmospheric pressure could be created within the chamber 10 so that continuous pressure is present to continuously extrude glass from the orifice 13. It has been found, however, that continuous pressure producing means are not essential anymore than the intermittent pressure producing means shown in the drawings, the constant force of gravity being sufficient to move the glass continuously both when in its highly fluid condition and in the chilled condition, say, at a temperature of 1850° F. plus. Under such an operation, either by continuous positive pressures or the continuous atmospheric pressure and force of gravity, intermittent time actuation of the means for feeding the cooling medium is not necessary. Under carefully controlled conditions the cooling medium can also be continuously fed through the conduits 22.

While the apparatus illustrated in the drawings is intended for the formation of gobs of high strength glass suitable for molding in intermittently presented article molds, because the glass may be discharged from the orifice 13 continuously, the process of the invention can also be employed for the production of continuous glass bodies. For example, if the orifice 13 is made in the form of a slot, a thick ribbon of glass can be continuously flowed therefrom to form sheet glass possessing the high strength characteristic of glass processed according to the invention. In such an apparatus auxiliary mechanism for feeding the glass either onto a continous belt or between feeding rollers or other mechanisms is employed to carry the formed sheet of glass away from the forming orifice.

The mechanism illustrated in the figures is but one of many apparatuses which may be employed for carrying out the process of the invention and, though embodying invention itself, is not intended to limit the process constituting the invention in any way. Whatever mechanism is employed, the process of invention teaches that rapid chilling from a temperature at which the glass is highly fluid, say, in the order of 300–400° above its working temperature, results in the glass having extremely high strengths.

A massive body of glass produced through the practice of the invention was found to have about 13,000 p.s.i. flexural strength as compared to 2000 p.s.i. flexural strength for an identical body produced in a conventional manner. Both of the specimens tested were brought to the same representative damaged condition by similar, conventional, abrasive, surface treatment. Microscopic examination of the body of glass produced according to the invention reveals the absence of molecular aggregations, designated herein as micelles, whose presence in conventional glass bodies is indicative of low strength. Apparently the process of the invention by inhibiting the formation of the micelles in the glass results in the glass having the greatly increased strengths illustrated above.

I claim:

1. A process for forming massive bodies of glass having high strength, said process comprising maintaining a pool of glass at high temperature and fluidity, flowing said glass from said pool, continuously separating said glass as it flows into a plurality of thin sections, rapidly and thoroughly chilling such thin sections of said glass to a temperature just above its minimum molding temperature while continuing to flow said glass in such thin sections toward its point of final separation from said pool, recombining said chilled thin sections while continuing to flow said glass separating a measured charge of said chilled glass from the remainder of said glass, and depositing said measured charge in a mold.

2. A process for forming massive bodies of glass having high strength, said process comprising maintaining a pool of glass at high temperature and fluidity, flowing a body of said glass from said pool, flowing a plurality of streams of a heat absorbing medium across and through said body for rapidly chilling a quantity of said glass to a temperature just above its minimum molding temperature and depositing a measured charge of such chilled glass in a mold.

3. A process for forming massive bodies of glass having high strength, said process comprising maintaining a pool of glass at high temperature and fluidity, separating a measured volume of such glass from such pool, dividing said measured volume of glass into a plurality of thin sections, exposing said thin sections to a heat absorbing medium, recombining said thin sections to form a measured charge and depositing said measured charge in a mold for the body to be formed.

4. In a process for feeding measured gobs of glass to a multiple mold molding machine, the improvement comprising maintaining a large supply body of glass at high temperature, serially withdrawing measured charges of glass from said body, dividing each such withdrawn charge into a plurality of thin sections, exposing the surfaces of said sections to a cooling medium at a considerable temperature differential for chilling said sections, continuing the chilling of said sections until said charge as a whole approximates molding temperature and depositing said charge in a mold.

5. In a process for feeding measured gobs of glass to a multiple mold molding machine, the improvement comprising maintaining a large supply body of glass at high temperature, serially withdrawing measured charges of glass from said body, passing a plurality of closely spaced streams of heat exchanging fluid through and across each such withdrawn charge for rapidly chilling said charge to approximately its molding temperature and then depositing said charge in a mold.

6. A process for forming a massive body of glass having high strength, said process comprising maintaining a pool of glass at high temperature and fluidity, flowing glass from said pool along a defined pathway, rapidly and uniformly chilling such glass as it flows along said defined path until such glass reaches its desired forming temperature by separating it into thin sections and exposing the surfaces of such sections to heat exchange means at a substantially lower temperature and forming such glass as it departs from said defined pathway.

References Cited in the file of this patent

UNITED STATES PATENTS

| | | |
|---|---|---|
| 966,753 | Keefer | Aug. 9, 1910 |
| 1,311,474 | Wadsworth | July 29, 1919 |
| 1,718,608 | Soubier | June 25, 1929 |
| 2,229,489 | Barnard | Jan. 21, 1941 |
| 2,495,956 | Cook | Jan. 31, 1950 |
| 2,596,042 | Park | May 6, 1952 |
| 2,634,553 | Russell | Apr. 14, 1953 |

FOREIGN PATENTS

| | | |
|---|---|---|
| 543,172 | Great Britain | Feb. 12, 1942 |